US012127589B2

(12) United States Patent
Yu et al.

(10) Patent No.: US 12,127,589 B2
(45) Date of Patent: Oct. 29, 2024

(54) AND APPLICATION OF A MULTI-CHAMBER CARTRIDGE INCLUDING A HYDROGEL FORMULATION

(71) Applicant: Altria Client Services LLC, Richmond, VA (US)

(72) Inventors: Shaoyong Yu, Glen Allen, VA (US); Munmaya K. Mishra, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 163 days.

(21) Appl. No.: 17/492,815

(22) Filed: Oct. 4, 2021

(65) Prior Publication Data

US 2022/0015424 A1 Jan. 20, 2022

Related U.S. Application Data

(63) Continuation of application No. 15/983,483, filed on May 18, 2018, now abandoned, which is a
(Continued)

(51) Int. Cl.
*A24F 47/00* (2020.01)
*A24F 40/30* (2020.01)
(Continued)

(52) U.S. Cl.
CPC .............. *A24F 40/42* (2020.01); *A24F 40/30* (2020.01); *A24F 40/44* (2020.01); *B65D 25/04* (2013.01);
(Continued)

(58) Field of Classification Search
CPC ....................................................... A24F 40/30
See application file for complete search history.

(56) References Cited

U.S. PATENT DOCUMENTS

| | | | |
|---|---|---|---|
| 5,240,016 | A | 8/1993 | Nichols et al. |
| 9,333,311 | B2 | 5/2016 | Liu |

(Continued)

FOREIGN PATENT DOCUMENTS

| | | | |
|---|---|---|---|
| CN | 202445135 | U | 9/2012 |
| CN | 103300481 | A | 9/2013 |

(Continued)

OTHER PUBLICATIONS

Chinese Notice of Allowance and search report dated Nov. 4, 2022 for corresponding Chinese Patent Application No. 201780059917.0.

(Continued)

*Primary Examiner* — Eric Yaary
(74) *Attorney, Agent, or Firm* — Harness, Dickey & Pierce, P.L.C.

(57) ABSTRACT

An e-vaping device having a cartridge including an outer container extending in a longitudinal direction, a conduit within the outer container, a storage portion including pre-vapor formulation ingredients, the storage portion being between the outer container and the conduit and including a plurality of chambers, a plurality of wicks, each of the wicks being in communication with each of the chambers and the conduit and being configured to deliver one or more ingredients in each of the chambers to the conduit, and a coil heater located in the chimney and operatively coupled to each of the wicks. The e-vaping device also includes a power supply source coupled to the cartridge, the power supply source is configured to heat the wicks to vaporize ingredients located in respective chambers and generate a vapor corresponding to each of the vaporized ingredients.

18 Claims, 9 Drawing Sheets

Related U.S. Application Data continuation of application No. 15/291,606, filed on Oct. 12, 2016, now Pat. No. 10,004,265.

(51) Int. Cl.

| | |
|---|---|
| ***A24F 40/42*** | (2020.01) |
| ***A24F 40/44*** | (2020.01) |
| ***B65D 25/04*** | (2006.01) |
| ***F22B 1/28*** | (2006.01) |
| ***H05B 1/02*** | (2006.01) |
| *A24F 40/10* | (2020.01) |

(52) U.S. Cl.

CPC ........... *F22B 1/285* (2013.01); *H05B 1/0244* (2013.01); *A24F 40/10* (2020.01); *H05B 2203/021* (2013.01)

(56) References Cited

U.S. PATENT DOCUMENTS

| | | | | |
|---|---|---|---|---|
| 2011/0230816 | A1 | 9/2011 | Copp-Howland | |
| 2012/0260927 | A1 | 10/2012 | Liu | |
| 2013/0192616 | A1 | 8/2013 | Tucker et al. | |
| 2013/0192623 | A1* | 8/2013 | Tucker | H01C 17/00 131/329 |
| 2014/0000638 | A1 | 1/2014 | Sebastian et al. | |
| 2014/0060527 | A1 | 3/2014 | Liu | |
| 2014/0209105 | A1* | 7/2014 | Sears | A24F 40/44 131/328 |
| 2014/0216956 | A1 | 8/2014 | Ott | |
| 2014/0261489 | A1 | 9/2014 | Cadieux et al. | |
| 2014/0366898 | A1 | 12/2014 | Monsees et al. | |
| 2015/0101625 | A1 | 4/2015 | Newton et al. | |
| 2015/0208731 | A1 | 7/2015 | Malamud et al. | |
| 2016/0165956 | A1 | 6/2016 | Tucker et al. | |
| 2018/0235280 | A1* | 8/2018 | Biel | A24F 40/485 |
| 2019/0124982 | A1* | 5/2019 | Atkins | A24F 40/30 |

FOREIGN PATENT DOCUMENTS

| | | | |
|---|---|---|---|
| CN | 203399707 | U | 1/2014 |
| CN | 103796701 | A | 5/2014 |
| CN | 103960785 | A | 8/2014 |
| CN | 104068477 | A | 10/2014 |
| CN | 104219973 | A | 12/2014 |
| CN | 104244749 | A | 12/2014 |
| CN | 104244750 | A | 12/2014 |
| CN | 204070550 | U | 1/2015 |
| CN | 204104832 | U | 1/2015 |
| CN | 204104838 | U | 1/2015 |
| CN | 104540406 | A | 4/2015 |
| CN | 104812260 | A | 7/2015 |
| CN | 105188430 | A | 12/2015 |
| CN | 105473012 | A | 4/2016 |
| CN | 105792688 | A | 7/2016 |
| JP | 2016-509481 | A | 3/2016 |
| JP | 2016-523096 | A | 8/2016 |
| RU | 2014135380 | A | 3/2016 |
| WO | WO-2010/107613 | A1 | 9/2010 |
| WO | WO-2014/120479 | A1 | 8/2014 |
| WO | WO-2014201432 | A1 | 12/2014 |
| WO | WO-2015/000974 | A1 | 1/2015 |
| WO | WO-2015/123831 | A1 | 8/2015 |
| WO | WO-2015140012 | A1 | 9/2015 |
| WO | WO-2016/079596 | A1 | 5/2016 |
| WO | WO-2016090426 | A1 | 6/2016 |

OTHER PUBLICATIONS

Korean Office Action dated Nov. 2, 2022 for corresponding Korean Patent Application No. 2019-7007304.

Notice of Reasons for Rejection dated Apr. 18, 2022 issued in corresponding Japanese patent application No. 2019-519269.

Chinese Office Action dated Dec. 31, 2021 for corresponding Chinese Patent Application No. 201780059917.0.

Notice of Allowance dated Jul. 27, 2022 for corresponding Japanese Patent Application No. 2019-519269.

Office Action dated Jun. 2, 2022 for corresponding Chinese Patent Application No. 201780059917.0.

Japanese Office Action dated Oct. 4, 2021, corresponding to Japanese Patent Application No. 2019-519269.

International Search Report and Written Opinion thereof dated Dec. 21, 2017 for corresponding International Patent Application No. PCT/EP2017/076119.

International Preliminary Report on Patentability for corresponding International Application No. PCT/EP2017/076119 dated Nov. 27, 2018.

Notice of Allowance and Search Report for Russian Patent Application No. 2019114017 mailed on Dec. 14, 2020 and English translation thereof.

Written Opinion for corresponding International Patent Application No. PCT/EP2017/076119 mailed on Sep. 10, 2018.

Chinese Office Action and Search Report dated Jun. 25, 2021 for corresponding Chinese Patent Application No. 201780059917.0.

Office Action dated Apr. 24, 2020, corresponding to U.S. Appl. No. 15/983,483.

Office Action dated Dec. 28, 2020, corresponding to U.S. Appl. No. 15/983,483.

Korean Notice of Allowance dated May 18, 2023 for corresponding Korean Patent Application No. 2019-7007304.

* cited by examiner

AND APPLICATION OF A MULTI-CHAMBER CARTRIDGE INCLUDING A HYDROGEL FORMULATION

CROSS-REFERENCE TO RELATED APPLICATION

The present application is a continuation under 35 U.S.C. § 120 of U.S. application Ser. No. 15/983,483, filed on May 18, 2018, which is a continuation of U.S. application Ser. No. 15/291,606, filed Oct. 12, 2016, the entire contents of which is hereby incorporated herein by reference.

BACKGROUND OF THE INVENTION

Field of the Invention

Some example embodiments relate generally to a cartridge for an e-vaping device, and/or to an e-vaping device including a multi-chamber cartridge.

Related Art

Electronic vaping devices are used to vaporize a pre-vapor formulation into a vapor in order for an operator of the e-vaping device to draw the vapor through outlet(s) of the e-vaping device. These electronic vaping devices may be referred to as e-vaping devices. An e-vaping device may typically include several e-vaping elements such as a power supply section and a cartridge. The power supply section includes a power source such as a battery, and the cartridge includes a heater along with a reservoir capable of holding the pre-vapor formulation, the cartridge including a conduit such as a chimney that conveys the vapor to the mouth of the operator of the e-vaping device. The heater in the cartridge is in contact with the pre-vapor formulation via a wick, and is configured to heat the pre-vapor formulation to generate a vapor. The heater may be intertwined with the wick. The pre-vapor formulation typically includes an amount of nicotine and optionally other ingredients such as acids, propylene glycol, glycerol or flavorants. For example, the pre-vapor formulation may include a liquid, solid and/or gel formulation including, but not limited to, water, beads, solvents, active ingredients, ethanol, plant extracts, natural or artificial flavors, and/or vapor formers such as glycerin and/or propylene glycol.

E-vaping devices may include a cartridge defining a single chamber where all the ingredients, such as the pre-vapor formulation, aromas, and the like, are included. However, some of the ingredients may react with each other, resulting in degradation of the pre-vapor formulation and/or of other ingredients.

SUMMARY OF THE INVENTION

At least one example embodiment relates to an e-vaping device including a multi-chamber cartridge.

In one example embodiment, the cartridge includes two or more chambers, each one of the chambers including one or more ingredients, acids, or flavorants and including a wick in fluid communication with the chimney. In example embodiments, one or more of the ingredients, acids, and flavorants are in hydrogel form. For example, the hydrogels may be prepared with biopolymers or bio-derived polymers, and reduce or substantially prevent or inhibit premature evaporation of the ingredients, acids, or flavorants. In addition, the hydrogel form reduces or substantially prevents or inhibits mixing of the ingredients, acids, or flavorants in case of a leak between the one or more chambers.

In one embodiment, a plurality of separators may define two or more chambers within the cartridge For example, the separators may be inserted between the outer surface of the chimney and the inner surface of the cartridge, defining a plurality of chambers. For example, the separators may be formed or include polyester and/or glass. Although the above describes the use of separators, other methods and techniques of creating two or more chambers within the cartridge may also be used.

In one embodiment, a wick may connect each one of the chambers to the chimney. Accordingly, during operation of the e-vaping device, the contents of each of the chambers are separately heated, and during evaporation are transferred from each chamber via the wick into the common chimney. The resulting vapor is thus a mixture of the vapors formed in each one of the chambers and passes through the mouth-end insert of the e-vaping device and reach the mouth of the operator of the e-vaping device. Accordingly, the ingredients present in each one of the chambers are only mixed together when they are in vapor form in the chimney, and are not mixed together prior to transforming into vapor form. Accordingly, the stability of the various ingredients of the pre-vapor formulation when in liquid or gel form is substantially improved.

In various example embodiments, because the ingredients are held in separate chambers in liquid or gel form, the ingredients are only mixed during operation of the e-vaping device. Accordingly, mixing the various ingredients only takes place when the e-vaping device is being operated by an adult e-vaper, but not when the e-vaping device is unused. As a result, the harshness of the vapor consumed by the adult e-vaper is reduced, and ingredients that may react with each other and degrade can be included as part of the pre-vapor formulation of an e-vaping device.

In various example embodiments, specific ingredients of the pre-vapor formulation are kept separate from other ingredients. For example, flavorants are kept in one chamber while acids are kept in another separate chamber. In other embodiments, nicotine is kept in a chamber while acids are kept in another separate chamber. In other embodiments, a vapor former is kept in one chamber while nicotine, acids or flavorants are kept in another separate chamber.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
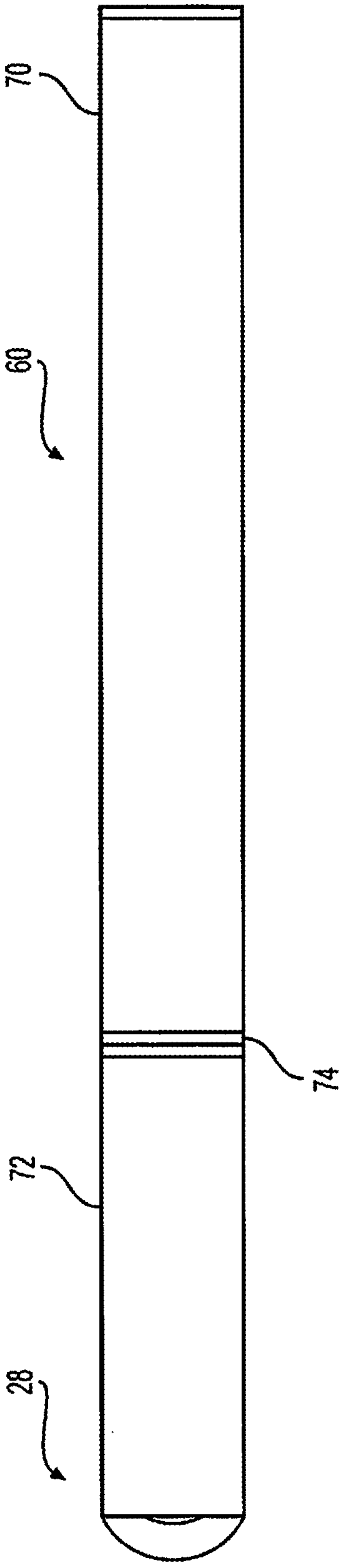
FIG. 1 is a side view of an e-vaping device, according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms "first," "second," "third," etc. may be used herein to describe various elements, regions, layers, ingredients and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations and/or elements, but do not preclude the presence or addition of one or more other features, integers, steps, operations, elements and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%.

As used herein, the term "vapor former" describes any suitable known compound or mixture of compounds that, in use, facilitates formation of a vapor and that is substantially resistant to thermal degradation at the operating temperature of the e-vaping device. Suitable vapor-formers may include various compositions of polyhydric alcohols such as propylene glycol and/or glycerol or glycerin. In at least one embodiment, the vapor former is propylene glycol.

FIG. 1 is a side view of an e-vaping device 60, according to an example embodiment. In FIG. 1, the e-vaping device 60 includes a first section or cartridge 70 and a second section 72 or power supply section 72, which are coupled together at a threaded joint 74 or by other connecting structure such as a snug-fit, snap-fit, detent, clamp and/or clasp or the like. In at least one example embodiment, the first section or cartridge 70 may be a replaceable cartridge, and the second section 72 may be a reusable section. Alternatively, the first section or cartridge 70 and the second section 72 may be integrally formed in one piece. In at least one embodiment, the second section 72 includes a LED at a distal end 28 thereof.

Figure 2:
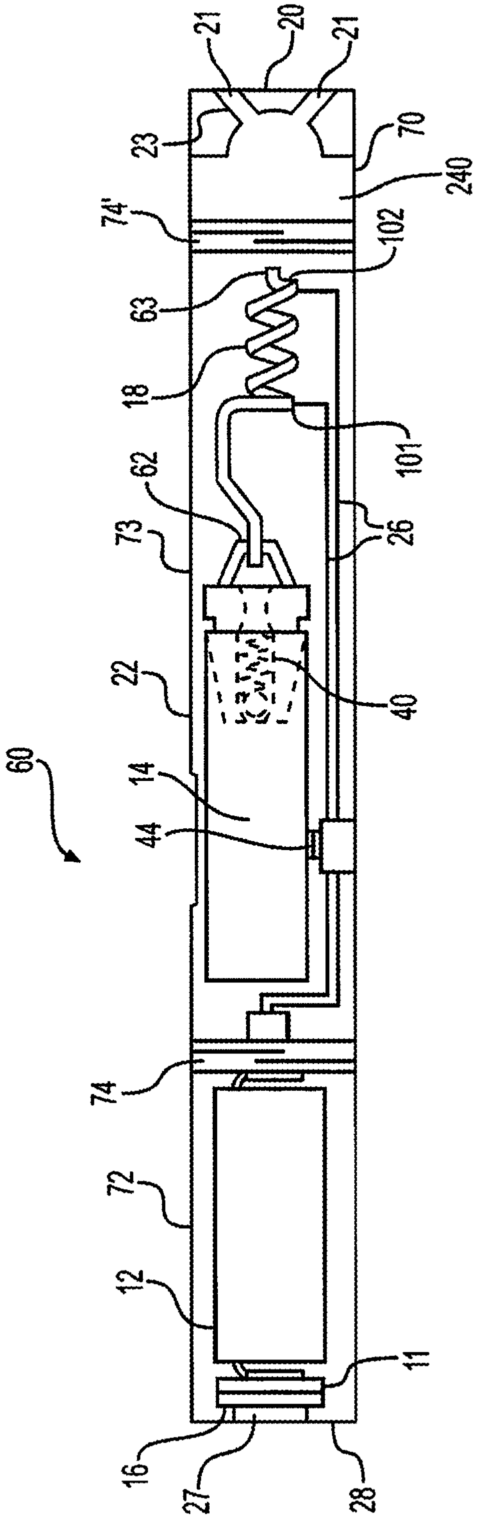
FIG. 2 is a longitudinal cross-sectional view of an e-vaping device, according to an example embodiment.

FIG. 2 is a cross-sectional view of an example embodiment of an e-vaping device. As shown in FIG. 2, the first section or cartridge 70 can house a mouth-end insert 20, a capillary tube 18, and a reservoir 14.

In example embodiments, the reservoir 14 may include a wrapping of gauze about an inner tube (not shown). For example, the reservoir 14 may be formed of or include an outer wrapping of gauze surrounding an inner wrapping of gauze. In at least one example embodiment, the reservoir 14 may be formed of or include an alumina ceramic in the form of loose particles, loose fibers, or woven or nonwoven fibers. Alternatively, the reservoir 14 may be formed of or include a cellulosic material such as cotton or gauze material, or a polymer material, such as polyethylene terephthalate, in the form of a bundle of loose fibers. A more detailed description of the reservoir 14 is provided below.

The second section 72 can house a power supply 12, control circuitry 11 configured to control the power supply 12, and a puff sensor 16. The puff sensor 16 is configured to sense when an operator of the e-vaping device is drawing on the e-vaping device 60, which triggers operation of the power supply 12 via the control circuitry 11 to heat the pre-vapor formulation housed in the reservoir 14, and thereby form a vapor. A threaded portion 74 of the second section 72 can be connected to a battery charger, when not connected to the first section or cartridge 70, to charge the battery or power supply 12.

In example embodiments, the capillary tube 18 is formed of or includes a conductive material, and thus may be configured to be its own heater by passing current through the tube 18. The capillary tube 18 may be any electrically conductive material capable of being heated, for example resistively heated, while retaining the necessary structural integrity at the operating temperatures experienced by the capillary tube 18, and which is non-reactive with the pre-vapor formulation. Suitable materials for forming the capillary tube 18 are one or more of stainless steel, copper, copper alloys, porous ceramic materials coated with film resistive material, nickel-chromium alloys, and combinations thereof. For example, the capillary tube 18 is a stainless steel capillary tube 18 and serves as a heater via electrical leads 26 attached thereto for passage of direct or alternating current along a length of the capillary tube 18. Thus, the stainless steel capillary tube 18 is heated by, for example, resistance heating. Alternatively, the capillary tube 18 may be a non-metallic tube such as, for example, a glass tube. In such an embodiment, the capillary tube 18 also includes a conductive material such as, for example, stainless steel, nichrome or platinum wire, arranged along the glass tube and capable of being heated, for example resistively. When the conductive material arranged along the glass tube is heated, pre-vapor formulation present in the capillary tube 18 is heated to a temperature sufficient to at least partially volatilize pre-vapor formulation in the capillary tube 18.

In at least one embodiment, the electrical leads 26 are bonded to the metallic portion of the capillary tube 18. In at least one embodiment, one electrical lead 26 is coupled to a first, upstream portion 101 of the capillary tube 18 and a second electrical lead 26 is coupled to a downstream, end portion 102 of the capillary tube 18.

In operation, when an operator of the e-vaping device draws on the e-vaping device, the puff sensor 16 detects a pressure gradient caused by the drawing of the operator of the e-vaping device, and the control circuitry 11 controls heating of the pre-vapor formulation located in the reservoir 14 by providing power to the capillary tube 18. Once the capillary tube 18 is heated, the pre-vapor formulation contained within a heated portion of the capillary tube 18 is volatilized and emitted from the outlet 63, where the pre-vapor formulation expands and mixes with air and forms a vapor in mixing chamber 240.

As shown in FIG. 2, the reservoir 14 includes a valve 40 configured to maintain the pre-vapor formulation within the reservoir 14 and to open when the reservoir 14 is squeezed and pressure is applied thereto, the pressure being created when an operator of the e-vaping device draws on the e-vaping device at the mouth-end insert 20, which results in the reservoir 14 forcing the pre-vapor formulation through the outlet 62 of the reservoir 14 to the capillary tube 18. In at least one embodiment, the valve 40 opens when a critical, minimum pressure is reached so as to avoid inadvertently dispensing pre-vapor formulation from the reservoir 14. In at least one embodiment, the pressure required to press the pressure switch 44 is high enough such that accidental heating due to the pressure switch 44 being inadvertently pressed by outside factors such as physical movement or collision with outside objects is avoided.

The power supply 12 of example embodiments can include a battery arranged in the second section 72 of the e-vaping device 60. The power supply 12 is configured to apply a voltage to volatilize the pre-vapor formulation housed in the reservoir 14.

In at least one embodiment, the electrical connection between the capillary tube 18 and the electrical leads 26 is substantially conductive and temperature resistant while the capillary tube 18 is substantially resistive so that heat generation occurs primarily along the capillary tube 18 and not at the contacts.

The power supply section or battery 12 may be rechargeable and include circuitry allowing the battery to be chargeable by an external charging device. In example embodiments, the circuitry, when charged, provides power for a given number of draws or draws on the e-vaping device, after which the circuitry may have to be re-connected to an external charging device.

In at least one embodiment, the e-vaping device 60 may include control circuitry 11 which can be, for example, on a printed circuit board. The control circuitry 11 may also include a heater activation light 27 that is configured to glow when the device is activated. In at least one embodiment, the heater activation light 27 comprises at least one LED and is at a distal end 28 of the e-vaping device 60 so that the heater activation light 27 illuminates a cap which takes on the appearance of a burning coal when the operator of the e-vaping device draws on the e-vaping device. Moreover, the heater activation light 27 can be configured to be visible to the operator of the e-vaping device. The light 27 may also be configured such that the operator of the e-vaping device can activate and/or deactivate the light 27 when desired, such that the light 27 is not activated during vaping if desired.

In at least one embodiment, the e-vaping device 60 further includes a mouth-end insert 20 having at least two off-axis, diverging outlets 21 that are uniformly distributed around the mouth-end insert 20 so as to substantially uniformly distribute vapor in the mouth of an operator of the e-vaping device during operation of the e-vaping device. In at least one embodiment, the mouth-end insert 20 includes at least two diverging outlets 21 (e.g., 3 to 8 outlets or more). In at least one embodiment, the outlets 21 of the mouth-end insert 20 are located at ends of off-axis passages 23 and are angled outwardly in relation to the longitudinal direction of the e-vaping device 60 (e.g., divergently). As used herein, the term "off-axis" denotes an angle to the longitudinal direction of the e-vaping device.

In at least one embodiment, the e-vaping device 60 is about the same size as a tobacco-based product. In some embodiments, the e-vaping device 60 may be about 80 mm to about 110 mm long, for example about 80 mm to about 100 mm long and about 7 mm to about 10 mm in diameter.

The outer cylindrical housing 22 of the e-vaping device 60 may be formed of or include any suitable material or combination of materials. In at least one embodiment, the outer cylindrical housing 22 is formed at least partially of metal and is part of the electrical circuit connecting the control circuitry 11, the power supply 12 and the puff sensor 16.

As shown in FIG. 2, the e-vaping device 60 can also include a middle section (third section) 73, which can house the pre-vapor formulation reservoir 14 and the capillary tube 18. The middle section 73 can be configured to be fitted with a threaded joint 74' at an upstream end of the first section or cartridge 70 and a threaded joint 74 at a downstream end of the second section 72. In this example embodiment, the first section or cartridge 70 houses the mouth-end insert 20, while the second section 72 houses the power supply 12 and the control circuitry 11 that is configured to control the power supply 12.

Figure 3:
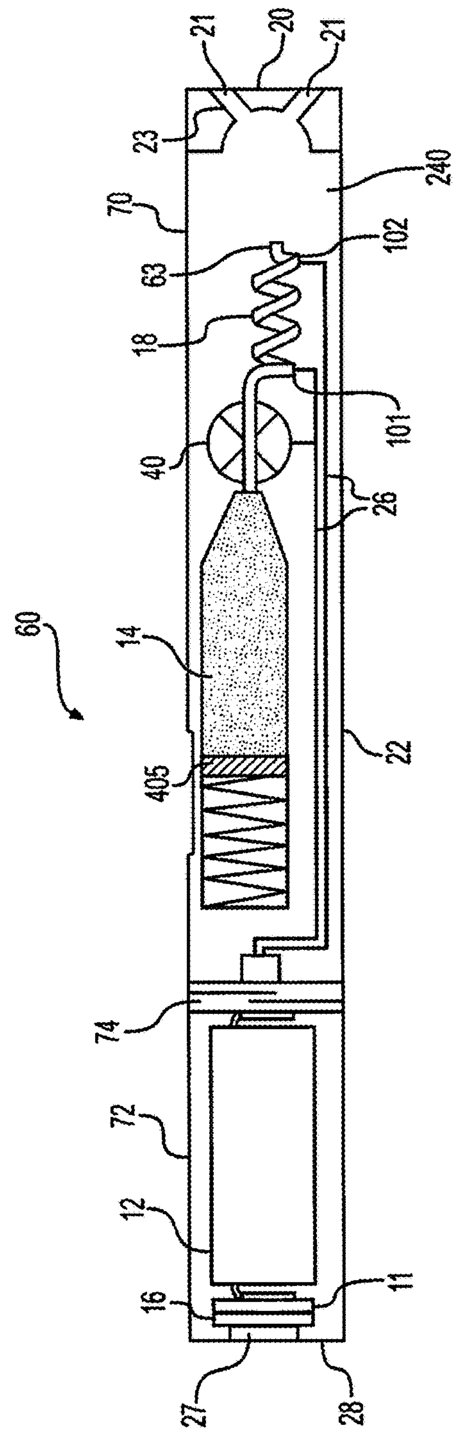
FIG. 3 is a longitudinal cross-sectional view of another example embodiment of an e-vaping device.

FIG. 3 is a cross-sectional view of an e-vaping device according to an example embodiment. In at least one embodiment, the first section or cartridge 70 is replaceable so as to avoid the need for cleaning the capillary tube 18. In at least one embodiment, the first section or cartridge 70 and the second section 72 may be integrally formed without threaded connections to form a disposable e-vaping device.

As shown in FIG. 3, in other example embodiments, a valve 40 can be a two-way valve, and the reservoir 14 can be pressurized. For example, the reservoir 14 can be pressurized using a pressurization arrangement 405 configured to apply constant pressure to the reservoir 14. As such, emission of vapor formed via heating of the pre-vapor formulation housed in the reservoir 14 is facilitated. Once pressure upon the reservoir 14 is relieved, the valve 40 closes and the heated capillary tube 18 discharges any pre-vapor formulation remaining downstream of the valve 40.

Figure 4:
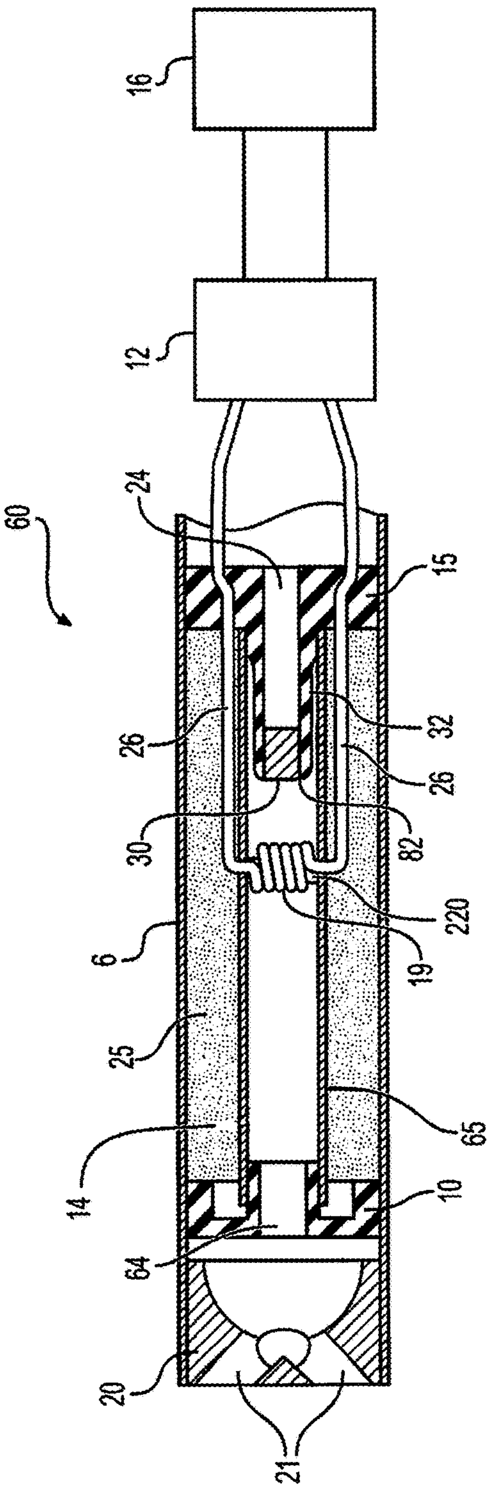
FIG. 4 is a longitudinal cross-sectional view of another example embodiment of an e-vaping device.

FIG. 4 is a longitudinal cross-sectional view of another example embodiment of an e-vaping device. In FIG. 4, the e-vaping device 60 can include a central air passage 24 in an upstream seal 15. The central air passage 24 opens to the inner tube 65. Moreover, the e-vaping device 60 includes a reservoir 14 configured to store the pre-vapor formulation. The reservoir 14 includes the pre-vapor formulation and optionally a storage medium 25 such as gauze configured to store the pre-vapor formulation therein. In an embodiment, the reservoir 14 is contained in an outer annulus between the outer tube 6 and the inner tube 65. The annulus is sealed at an upstream end by the seal 15 and by a stopper 10 at a downstream end so as to prevent leakage of the pre-vapor formulation from the reservoir 14. The heater 19 at least partially surrounds a central portion of a wick 220 such that when the heater is activated, the pre-vapor formulation present in the central portion of the wick 220 is vaporized to form a vapor. The heater 19 is connected to the battery 12 by two spaced apart electrical leads 26. The e-vaping device 60 further includes a mouth-end insert 20 having at least two outlets 21. The mouth-end insert 20 is in fluid communication with the central air passage 24 via the interior of inner tube 65 and a central passage 64, which extends through the stopper 10.

The e-vaping device 60 may include an air flow diverter comprising an impervious plug 30 at a downstream end 82 of the central air passage 24 in seal 15. In at least one example embodiment, the central air passage 24 is an axially extending central passage in seal 15, which seals the upstream end of the annulus between the outer and inner tubes 6, 65. The radial air channel 32 directing air from the central passage 20 outward toward the inner tube 65. In operation, when an operator of the e-vaping device draws on the e-vaping device, the puff sensor 16 detects a pressure gradient caused by the drawing of the operator of the e-vaping device, and as a result the control circuitry 11 controls heating of the pre-vapor formulation located in the reservoir 14 by providing power the heater 19.

Figure 5A:
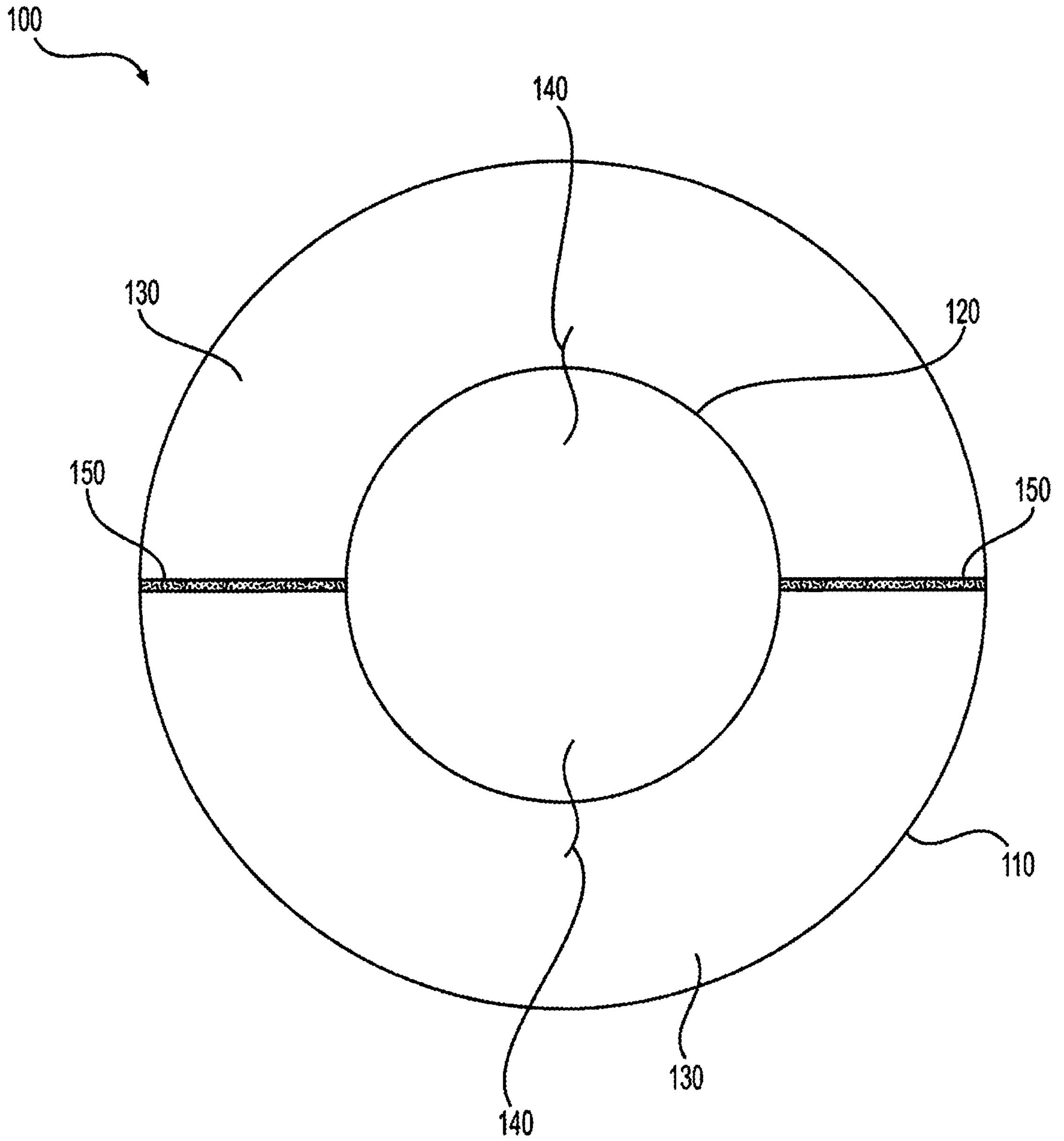
FIGS. 5A-B are cross-sections of cartridge including a plurality of chambers, according to at least one example embodiment.
Figure 5B:
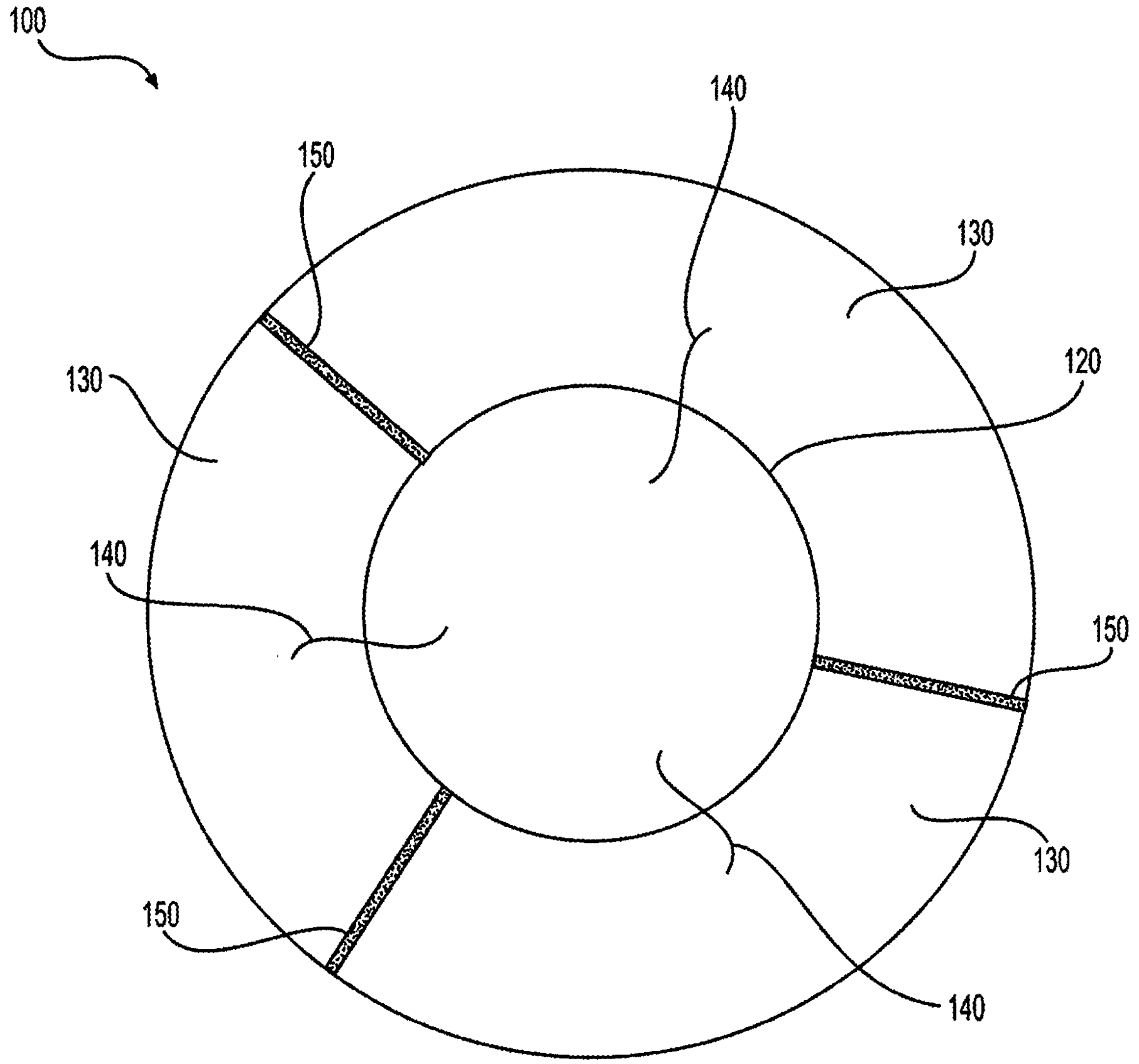

FIGS. 5A-5B are illustrations of cross-sections of a cartridge of an e-vaping device including a plurality of chambers, according to at least one example embodiment. In FIG. 5A, the cartridge 100 includes an outer shell 110 configured to include ingredients of the pre-vapor formulation, with a chimney 120 defined therein. According to at least one example embodiment, two chambers 130 are defined within the cartridge 100, each of the two chambers 130 including one or more elements or ingredients of the pre-vapor formulation. Each of the chambers 130 may include a wick 140 configured to allow ingredients of each chamber, whether in liquid form or in gel form, to transfer to the chimney 120 where they are heated and vaporized during operation of the e-vaping device. In one embodiment, the wick may be intertwined with portions of the heater (not shown) to heat the liquid present in the wick. When heated, the ingredients of the pre-vapor formulation are vaporized inside the chimney 120. As a result, the various ingredients present in all of the chambers 130 may only be mixed together during operation of the e-vaping device, and the ingredients present in one chamber 130 may be substantially prevented or inhibited from mixing with the ingredients of the other chamber 130 when the e-vaping device is not being operated.

According to at least one example embodiment, the various ingredients of the pre-vapor formulation enclosed in the several chambers 130 may be in the form of hydrogels, prepared with biopolymers of bio-derived polymers as carriers for the ingredient and may include, for example, nicotine, flavorants, aroma, acids, propylene glycol, glycerol, and any such ingredients of a pre-vapor formulation of an e-vaping device. An advantage of using hydrogels is that a hydrogel may increase stability and reduce degradation of a given ingredient such as, for example, a flavorant or an acid, due to passage of time, when the e-vaping device is not operated.

According to at least one example embodiment, the various chambers 130 are separated from each other by one or more separators 150. In one example embodiment, the one or more separators 150 are formed of or include a same material as the material of the outer shell 110 of the cartridge 100. For example, the one or more separators 150 may be formed of or may include polyester and/or glass, or may be formed of or may include metal tubing such as, for example, stainless steel tubing. The separators 150 reduce or substantially prevent or inhibit mixing of the various ingredients between the various chambers 130. In addition, the hydrogel form of the ingredients in each of the chambers 130 also reduces or substantially prevents or inhibits the possibility of leakage of the ingredients present in one of the chambers 130 into another one of the chambers 130.

In various example embodiments, specific ingredients of the pre-vapor formulation are kept separate from other ingredients. For example, flavorants are kept in one chamber 130 while acids are kept in another separate chamber 130. In other embodiments, nicotine is kept in a chamber 130 while acids are kept in another separate chamber 130. In other embodiments, a vapor former is kept in one chamber 130 while nicotine, acids or flavorants are kept in another separate chamber 130.

In FIG. 5B, the cartridge 100 includes an outer shell 110 configured to include ingredients of the pre-vapor formulation, with a chimney 120 defined therein. According to at least one example embodiment, three chambers 130 are defined within the cartridge 100, each of the three chambers 130 including one or more ingredients of the pre-vapor formulation. Each of the chambers 130 may include a wick 140 configured to allow ingredients of each chamber, whether in liquid form or in gel form, to transfer to the chimney 120 where, during operation of the e-vaping device, the ingredients from all the chambers are heated and vaporized. When heated, the ingredients of the pre-vapor formulation are vaporized inside the chimney 120. As a result, the various ingredients present in all of the chambers 130 may only be mixed together during operation of the e-vaping device, and the ingredients present in one chamber 130 are substantially prevented or inhibited from mixing with the ingredients of another chamber 130 when the e-vaping device is not being operated. Although FIG. 5B illustrates the e-vaping device 100 having three chambers 130, various example embodiments may include more than three chambers 130, such as, four, five, six or more, each of the chambers 130 including one or more ingredients of the pre-vapor formulation.

According to at least one example embodiment, the chambers 130 are separated from each other by one or more separators 150. In one embodiment, the one or more separators 150 may be formed of or may include a same material as the material of the outer shell 110 of the cartridge 100. The separators 150 are configured to reduce or substantially prevent or inhibit mixing of the ingredients present in one chamber 130 with the ingredients of another chamber 130. In example embodiments, the hydrogel form of the ingredients in each of the chambers 130 may also reduce or substantially prevent or inhibit the possibility of leakage of the ingredients in one of the chamber 130 outside of the chamber 130 or into another one of the chambers 130.

In various example embodiments, specific ingredients of the pre-vapor formulation are kept separate from other ingredients. For example, flavorants are kept in one chamber 130 while acids are kept in another separate chamber 130. In other embodiments, nicotine is kept in a chamber 130 while acids are kept in another separate chamber 130. In other embodiments, a vapor former is kept in one chamber 130 while nicotine, acids or flavorants are kept in another separate chamber 130.

Figure 6:
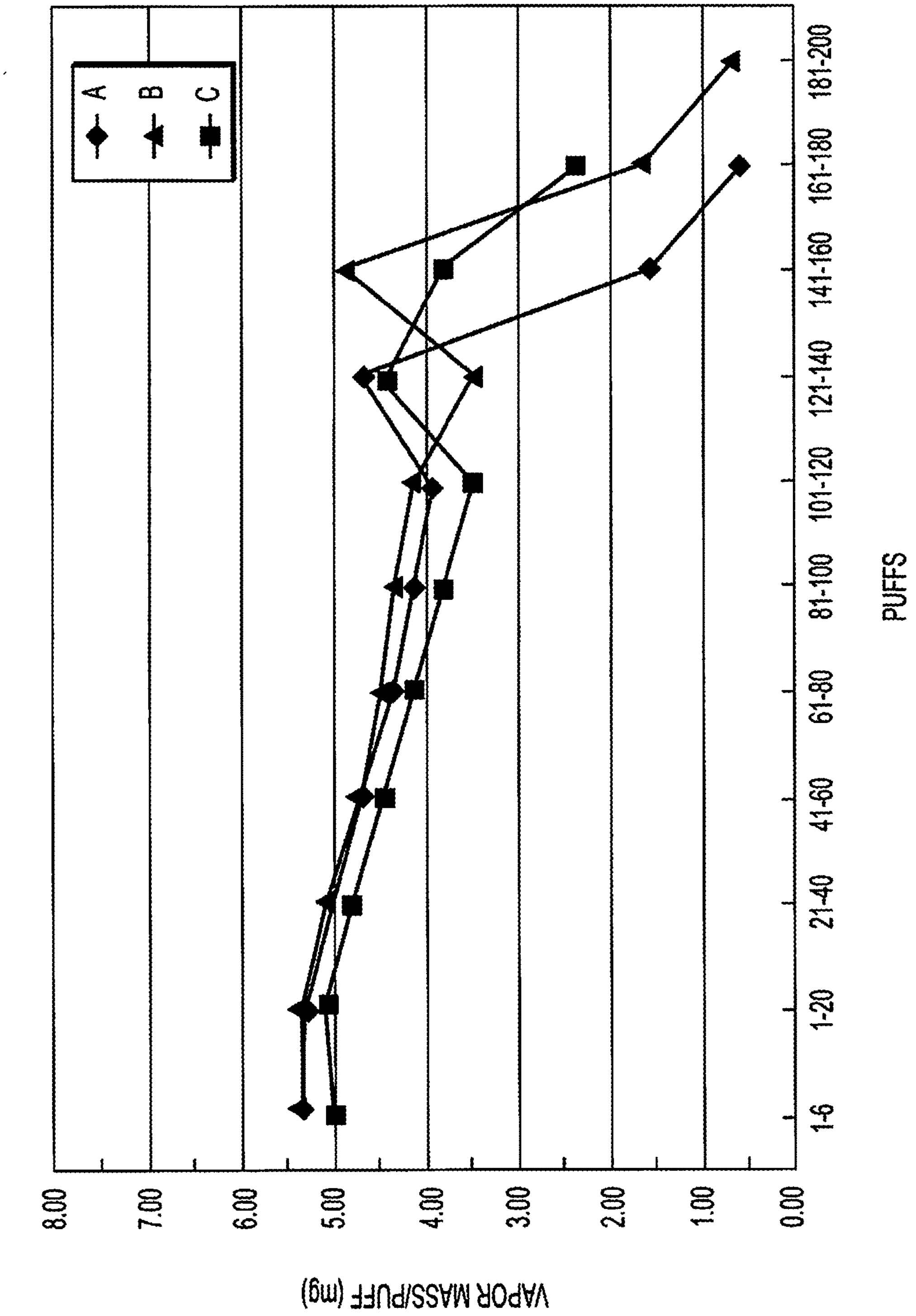
FIG. 6 is a graph illustrating the vapor mass per draw with respect to a number of draws for a dual chamber cartridge and single-chamber cartridges, according to at least one example embodiment.

FIG. 6 is a graph illustrating the profile of the vapor mass per draw with respect to a number of draws for a dual chamber cartridge and single-chamber cartridges, according to at least one example embodiment. In FIG. 6, the amount of vapor per draw is measured for three types of pre-vapor formulations: i) mixture A of nicotine-free flavorant gel with acid gel mixed at a 1:1 ratio and stored in a dual chamber, illustrated as trapezoidal data points; ii) mixture B of nicotine-free flavorant gel without acid stored in a single chamber cartridge, illustrated as solid triangular data points; and iii) mixture C of a hydrogel containing nicotine and flavorants in a single chamber cartridge, illustrated as solid square data points. Vapor mass tests are conducted using a 5 seconds, 55 cc, and square wave draw profile. Ten separate 20-draw collections were conducted with five seconds between draws and twenty draw increments. The vapor mass balance is calculated before and after smoking.

Figure 7:
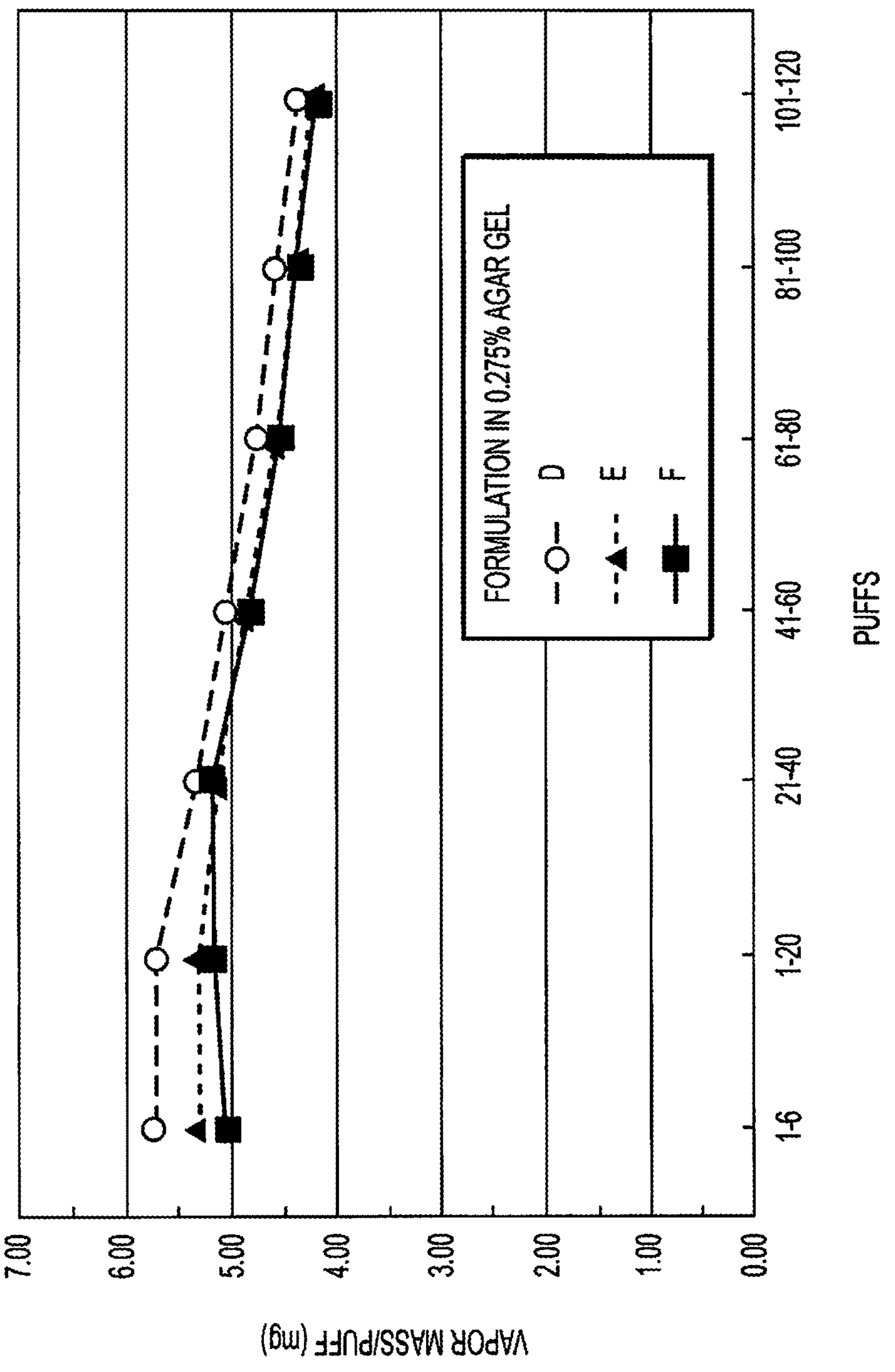
FIG. 7 is a graph illustrating the vapor mass per draw with respect to a number of draws for a dual chamber cartridge and single-chamber cartridges, according to at least one example embodiment.

FIG. 7 is a graph illustrating the vapor mass per draw with respect to a number of draws for a dual chamber cartridge and single-chamber cartridges, according to at least one example embodiment. In FIG. 7, the amount of vapor per draw is measured for three types of pre-vapor formulations: i) mixture D of nicotine-free flavorant gel with 1.8% acid gel stored in a single chamber cartridge, illustrated as empty circle data points; ii) mixture E of nicotine-free flavorant gel with 4.1% acid gel and flavorants, stored in a dual chamber, illustrated as solid triangular data points; and iii) mixture F of 4.1% nicotine and flavorants with 1.8% acid gel, stored in a single chamber, illustrated as solid square data points. Vapor mass tests are conducted using a 5 seconds, 55 cc, and square wave draw profile. Ten separate 20-draw collections were conducted with five seconds between draws and twenty draw increments. The vapor mass balance is calculated before and after smoking.

Figure 8:
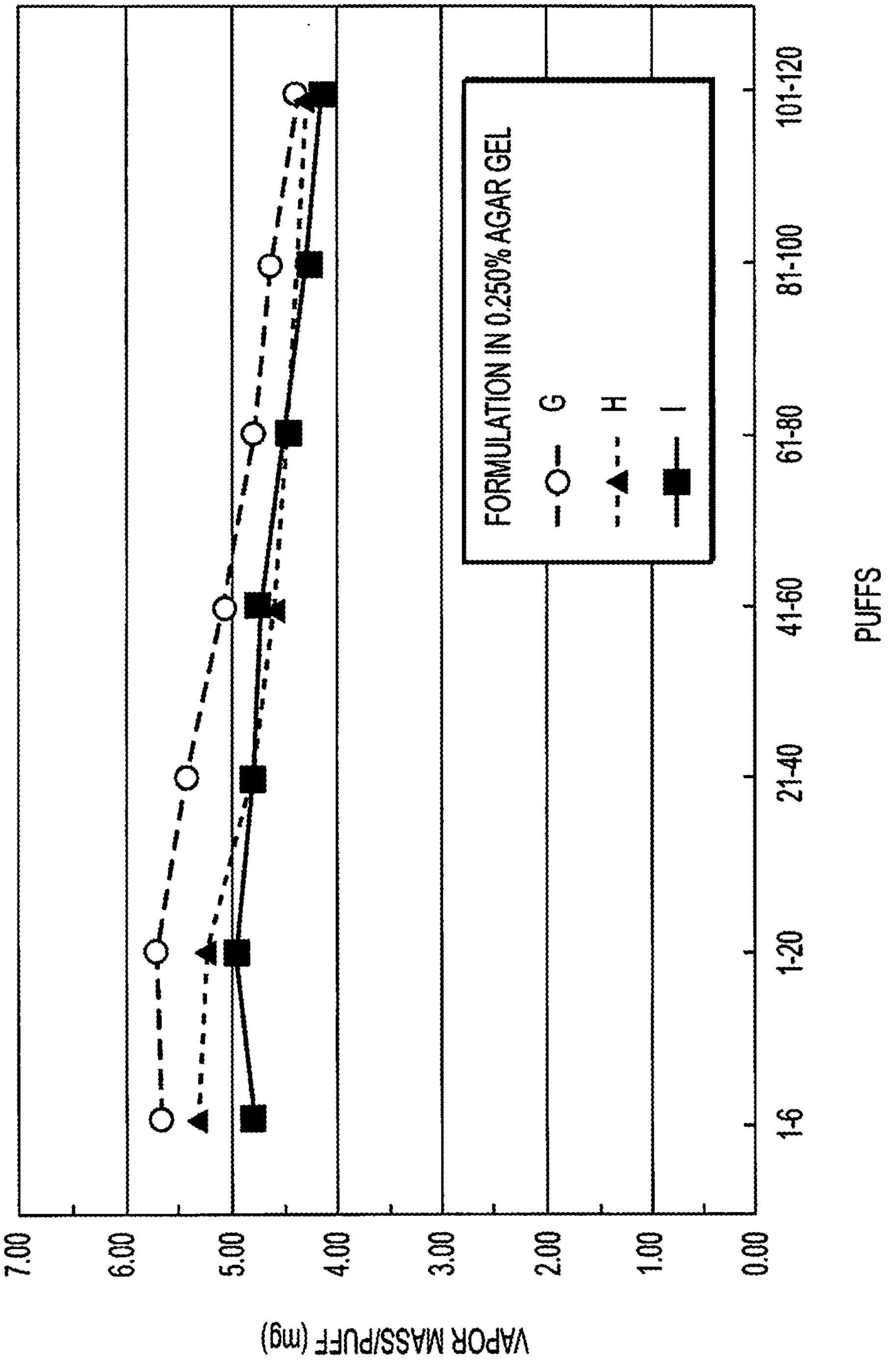
FIG. 8 is a graph illustrating the vapor mass per draw with respect to a number of draws for a dual chamber cartridge and single-chamber cartridges, according to at least one example embodiment.

FIG. 8 is a graph illustrating the vapor mass per draw with respect to a number of draws for a dual chamber cartridge and single-chamber cartridges, according to at least one example embodiment. In FIG. 8, the amount of vapor per draw is measured for three types of pre-vapor formulations: i) mixture G of nicotine-free flavorant gel with 1.8% acid gel stored in a single chamber cartridge, illustrated as empty circle data points; ii) mixture H of 4.1% nicotine and flavorant in hydrogel form, stored in a single chamber, illustrated as solid triangular data points; and iii) mixture I of 4.1% nicotine, flavorant and 1.8% acid in hydrogel form, stored in a dual chamber, illustrated as solid square data points. Vapor mass tests are conducted using a 5 seconds, 55 cc, and square wave draw profile. Ten separate 20-draw collections were conducted with five seconds between draws and twenty draw increments. The vapor mass balance is calculated before and after smoking.

Based on the test conducted, FIGS. 6-8 illustrate that the vapor mass profile of the dual chamber cartridge is consistent with the vapor mass profiles of single chamber cartridges, but the degradation of the vapor mass profile for the dual chamber cartridge is substantially reduced compared to the degradation of the vapor mass profile of the single chamber cartridges. For example, the graphs illustrated in FIGS. 6-8 compare the Aerosol Mass Delivery per Draw between a dual chamber cartridge, according to example embodiments, and a single chamber cartridge. The graphs show that the aerosol mass delivery generated by a dual chamber cartridge is substantially equivalent to the aerosol mass delivery generated by a single chamber cartridge. Accordingly, the aerosol mass delivery of a dual chamber is as reliable as the aerosol mass delivery for a single chamber cartridge.

Figure 9A:
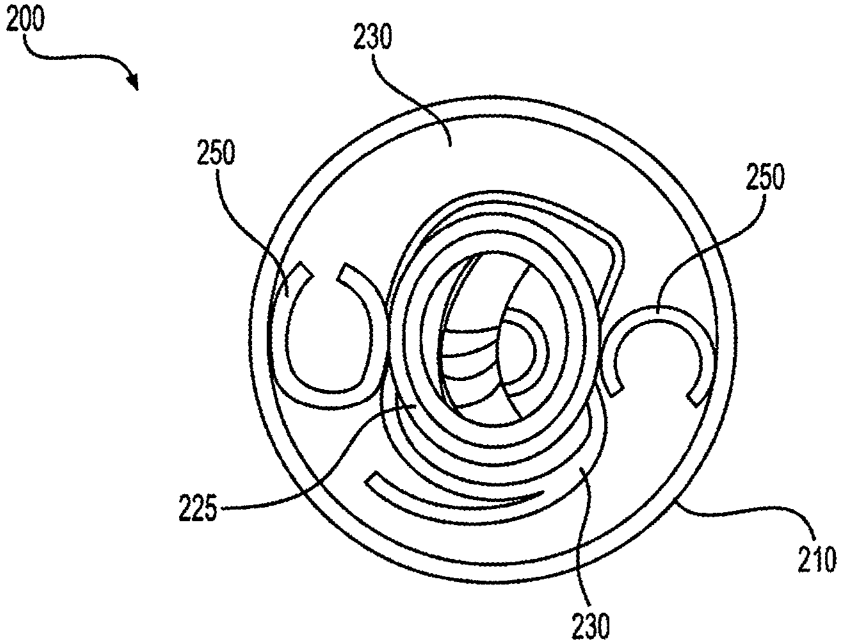
FIGS. 9A-B are photographs of a cross-section of an e-vaping device, according to various example embodiments.
Figure 9B:
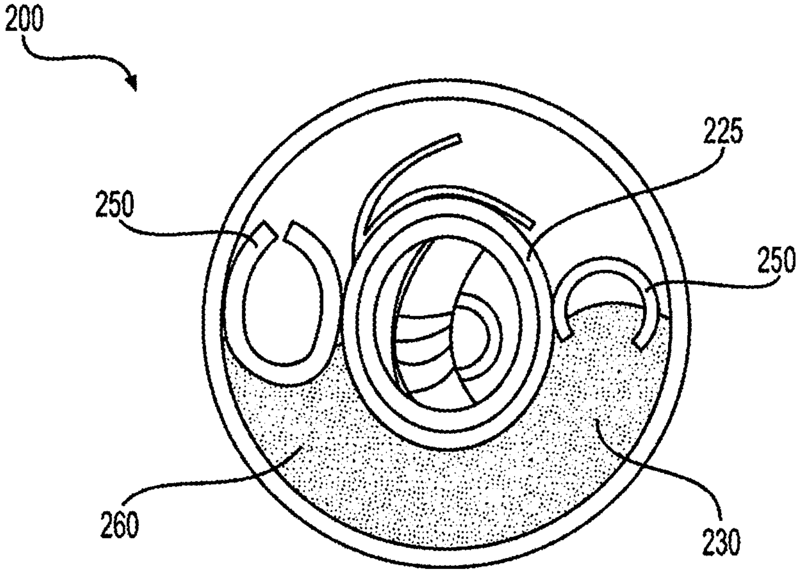

FIGS. 9A-B are photographs of a cross-section of an e-vaping device 200, according to various example embodiments. In FIG. 9A, the cartridge 200 includes an outer shell 210 configured to include ingredients of the pre-vapor formulation, with a chimney 220 defined therein. According to at least one example embodiment, two chambers 230 are defined within the cartridge 200, each of the two chambers 130 being configured to include one or more ingredients of the pre-vapor formulation. According to at least one example embodiment, the various chambers 230 are separated from each other by one or more separators 250. In one example embodiment, the one or more separators 250 are formed of or include a same material as the material of the outer shell 210 of the cartridge 200. For example, the one or more separators 250 may be formed of or may include polyester and/or glass. The separators 250 are configured to reduce or substantially prevent or inhibit mixing of the various ingredients between the various chambers 230.

FIG. 9B is similar to FIG. 9A, except that one of chambers 230 includes an amount of gauze 260, the gauze 260 being configured to retain liquid ingredients of the pre-vapor formulation.

Figure 10A:
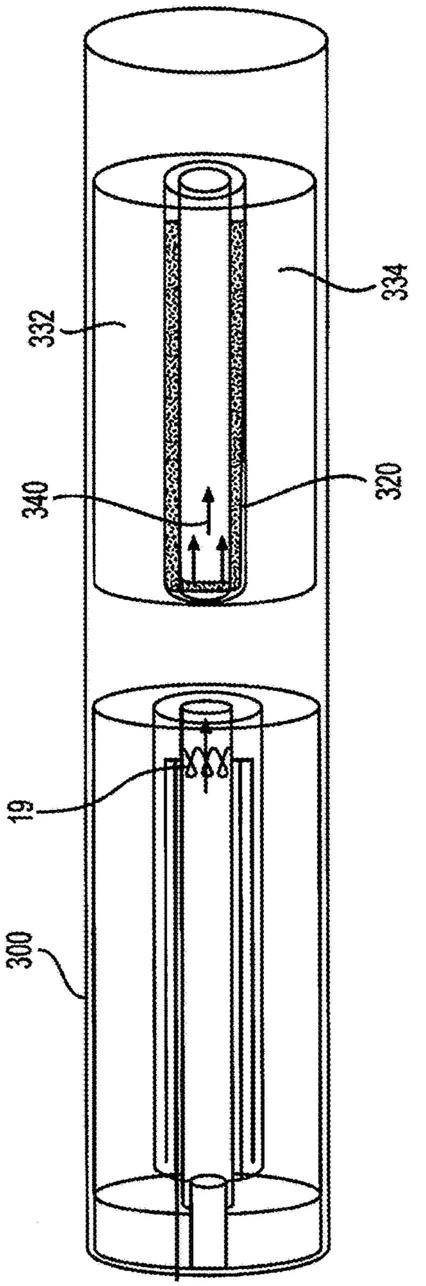
FIGS. 10A-B are cross-sections of an e-vaping device including a plurality of chambers, according to various example embodiments.
Figure 10B:
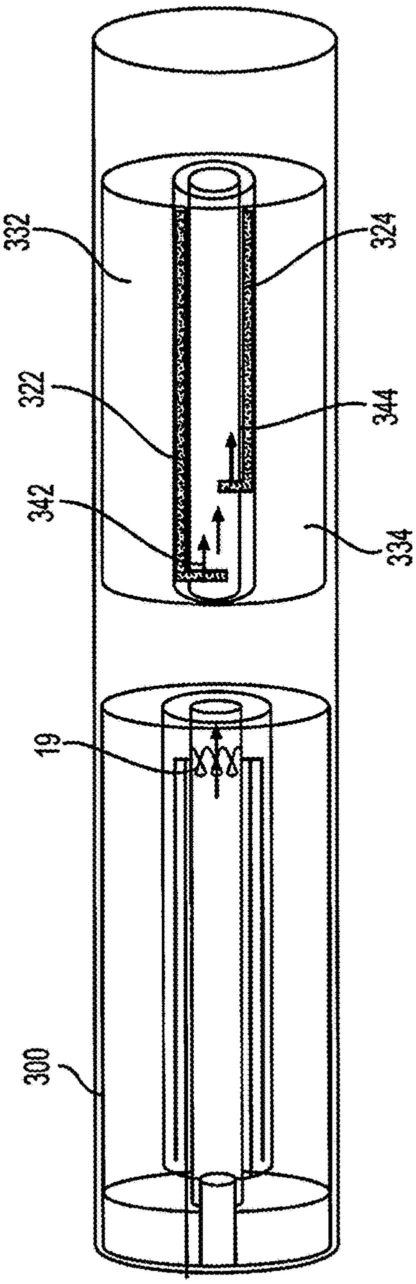

FIGS. 10A-B are cross-sections of an e-vaping device 300 including a plurality of chambers, according to various example embodiments. FIG. 10A illustrates an example e-vaping device 300 that includes a dual chamber cartridge with a single wick 320 where, during operation of the e-vaping device, the ingredients in both chambers 332 and 334 of the cartridge are transferred to the single wick 320 via, for example, capillary action or other action. Accordingly, during operation of the e-vaping device, the wick 320, in which ingredients from both chambers 332 and 334 are transferred, is heated via the heater 19, and the ingredients 340 of both chambers 332 and 334 are heated and vaporized substantially contemporaneously, before being transferred to the mouth-end insert (not shown) of the e-vaping device.

FIG. 10B illustrates an example e-vaping device 300 that includes a dual chamber cartridge via dual wicks 322 and 324 where, during operation of the e-vaping device, the ingredients in each of the chambers 332 and 334 of the cartridge are transferred to each wick 322 and 324, respectively via, for example, capillary action or other action. For example, the ingredients in chamber 332 are transferred to the wick 322, and the ingredients in chamber 334 are transferred to the wick 324. As such, during operation of the e-vaping device, the ingredients from both chambers 332 and 334 are heated separately in the wicks 322 and 324 via the heater 19, and the heated and vaporized ingredients 342 and 344 are then transferred to the mouth-end insert (not shown) of the e-vaping device. Accordingly, the ingredients in each of the chambers 332 and 334 may not mix before and during operation of the e-vaping device.

Example embodiments having thus been described, it will be obvious that the same may be varied in many ways. Such variations are not to be regarded as a departure from the intended spirit and scope of example embodiments, and all modifications as would be obvious to one skilled in the art are intended to be included within the scope of the following claims.

What is claimed is:

1. A cartridge of an e-vaping device, comprising:
- an outer container extending in a longitudinal direction;
- a conduit within the outer container;
- a storage portion between the outer container and the conduit, the storage portion being configured to store pre-vapor formulation ingredients, and including a plurality of chambers arranged radially along the conduit, the plurality of chambers configured to each store pre-vapor formulation ingredients including at least one of nicotine, flavorants, aroma, acids, propylene glycol, glycerol and a combination thereof, two adjacent chambers of the plurality of chambers being separated by one or more separators, the one or more separators being distinct from an outer shell of the storage portion, each of the plurality of chambers being radially adjacent to at least one other of the plurality of chambers;
- a first wick in fluid communication with a first one of the plurality of chambers and the conduit and being configured to deliver one or more ingredients in the first one of the plurality of chambers to the conduit; and
- a second wick in fluid communication with a second one of the plurality of chambers and the conduit and being configured to deliver one or more ingredients in the second one of the plurality of chambers to the conduit, the first and second wicks being distinct from one another in the longitudinal direction, the first and second wicks configured to be heated separately from a distant heater such that the one or more ingredients in the first one of the plurality of chambers to the conduit and the one or more ingredients in the second one of the plurality of chambers have distinct heating.

2. The cartridge of claim 1, wherein the one or more separators are configured to substantially inhibit first pre-vapor formulation ingredients in a first chamber of the plurality of chambers from mixing with second pre-vapor formulation ingredients in a second chamber of the plurality of chambers.

3. The cartridge of claim 1, wherein one or more of the pre-vapor formulation ingredients are mixed with a gel.

4. The cartridge of claim 1, wherein the plurality of chambers include one of two chambers, three chambers, four chambers, five chambers and six chambers.

5. The cartridge of claim 1, wherein the conduit is a chimney.

6. The cartridge of claim 1, wherein at least one of the chambers is configured to store at least one of the pre-vapor formulation ingredients and at least another of the chambers is configured to store at least another of the pre-vapor formulation ingredients.

7. The cartridge of claim 6, wherein one of the chambers is configured to store nicotine and another of the chambers is configured to store one or more acids.

8. The cartridge of claim 6, wherein one of the chambers is configured to store one or more flavorants and another of the chambers is configured to store one or more acids.

9. An e-vaping device, comprising:
- a cartridge including:
  - an outer container extending in a longitudinal direction;
  - a conduit within the outer container;
  - a storage portion between the outer container and the conduit, the storage portion being configured to store pre-vapor formulation ingredients, and including a plurality of chambers arranged radially along the conduit, the plurality of chambers configured to each store pre-vapor formulation ingredients including at least one of nicotine, flavorants, aroma, acids, propylene glycol, glycerol and a combination thereof, two adjacent chambers of the plurality of chambers being separated by one or more separators, the one or more separators being distinct from an outer shell of the storage portion, each of the plurality of chambers being radially adjacent to at least one other of the plurality of chambers;
  - a first wick in fluid communication with a first one of the plurality of chambers and the conduit and being configured to deliver one or more ingredients in the first one of the plurality of chambers to the conduit; and a second wick in fluid communication with a second one of the plurality of chambers and the conduit and being configured to deliver one or more ingredients in the second one of the plurality of chambers to the conduit;

a first heater separate from the first and second wicks, having a first distance to the first wick and a second distance to the second wick, the first and second distances being different; and a power supply source coupled to the cartridge, the power supply source being configured to power the first heater to heat the pre-vapor formulation ingredients via the first and second wicks.

10. The e-vaping device of claim 9, wherein a vapor resulting from the heating of the pre-vapor formulation ingredients and formed in the conduit is a mixture of vapors resulting from the heating of the ingredients stored in each of the plurality of chambers.

11. The e-vaping device of claim 9, wherein the conduit is a chimney.

12. A method of operating an e-vaping device, the e-vaping device including an outer shell and an inner conduit, a storage portion between the outer shell and the inner conduit being configured to store ingredients of a pre-vapor formulation and including a plurality of chambers arranged radially along the conduit, two adjacent chambers of the plurality of chambers being separated by one or more separators, the one or more separators being distinct from an outer shell of the storage portion, each of the plurality of chambers being radially adjacent to at least one other of the plurality of chambers, and a mouth-end insert, the method comprising:

storing one or more ingredients of the pre-vapor formulation in one or more of the plurality of chambers;

connecting a first one of the plurality of chambers with the inner conduit via a first wick configured to deliver the one or more ingredients present in the first one of the plurality of chambers to the inner conduit;

connecting a second one of the plurality of chambers with the inner conduit via a second wick configured to deliver the one or more ingredients present in the second one of the plurality of chambers to the inner conduit;

upon operation of the e-vaping device, vaporizing each of the ingredients delivered, from the first one of the plurality of chambers and the second one of the plurality of chambers, in the inner conduit to generate vaporized ingredients, the first and second wicks being distinct from one another in the longitudinal direction, the first and second wicks configured to be heated separately from a distant heater such that the one or more ingredients in the first one of the plurality of chambers to the conduit and the one or more ingredients in the second one of the plurality of chambers are vaporized at different temperatures and rates; and expressing a combination of the vaporized ingredients through the mouth-end insert.

13. The method of claim 12, further including separating each of the plurality of chambers, and inhibiting first pre-vapor formulation ingredients in the first one of the plurality of chambers from mixing with second pre-vapor formulation ingredients in the second one of the plurality of chambers.

14. The method of claim 12, wherein the storing comprises storing at least one ingredient of the pre-vapor formulation in at least one of the chambers and storing at least another ingredient of the pre-vapor formulation in at least another chamber.

15. The method of claim 14, wherein the storing comprises storing nicotine in one of the chambers and storing one or more acids in another of the chambers.

16. The method of claim 14, wherein the storing comprises storing one or more flavorants in one of the chambers and storing one or more acids in another of the chambers.

17. The cartridge of claim 1, wherein the plurality of chambers are adjacent to each other in a plane perpendicular to the longitudinal direction of the cartridge.

18. The e-vaping device of claim 9, wherein the plurality of chambers are adjacent to each other in a plane perpendicular to the longitudinal direction of the cartridge.

* * * * *